3,501,286
PLANT GROWTH CONTROL
Wilfried Draber, Ippendorf, Jurgen F. Falbe, Bonn, and Karl Heinz Büchel and Friedrich W. A. G. K. Korte, Hangelar, Germany, assignors to Shell Oil Company, New York, N.Y., a corporation of Delaware
No Drawing. Filed June 29, 1964, Ser. No. 379,005
Int. Cl. A01n 9/22
U.S. Cl. 71—92         4 Claims

ABSTRACT OF THE DISCLOSURE

Herbicidal composition and method employing certain substituted imidazole compounds.

---

This invention relates to compositions of matter suitable for the control of plant growth and methods for controlling unwanted plant growth. In particular this invention is concerned with the control of weeds and undesired plant growth with novel imidazole compositions.

In accordance with this invention imidazoles of the formula following have been found to be active herbicides, with various species thereof exhibiting a variety of desirable characteristics. At moderate dosages, all are general herbicides, preventing growth of broad-leaved and narrow-leaved plants, while at low dosages many are quite selective, permitting control of weeds in crops. These imidazoles have the general formula:

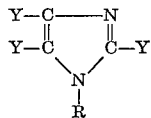

wherein R represents a hydrogen atom or substituted or unsubstituted alkyl, and Y represents a hydrogen atom, substituted or unsubstituted alkyl of 1–4 carbon atoms, or a negative substituent which may be halogen, cyano, or nitro, at least two of Y being ones of said negative substituents. The present invention therefore relates to compositions for controlling undesirable growth of plants, which compositions are characterized in that they contain one or more of the above-mentioned substituted imidazoles as active component.

A preferred class of these herbicides is that wherein each Y individually represents halogen; bromine, chlorine, and iodine having been found to be suitable. Especially preferred because of their high herbicide activity are those compounds wherein each Y is bromine.

Preferred because of useful herbicidal activity are imidazoles wherein R is alkyl of 1–10 carbon atoms, the compounds wherein R is lower alkyl of 1 to 4 carbon atoms being the most active of the group. R may be substituted alkyl of 1 to 10 carbon atoms, particularly preferred groups being cyano, alkoxy, or alkanoyl. R may also be allyl, cyanoallyl.

Particularly preferred because of their outstanding effectiveness are compositions containing compounds wherein R is hydrogen. An especially effective subclass is where R is hydrogen and each Y is halogen, particularly bromine. The tribromo-substituted imidazoles are highly active weed killers.

Typical examples of species of the imidazole herbicides of this invention include for example:

2,4,5-tribromo imidazole;
2,4,5-triiodo imidazole;
4,5-dibromo imidazole;
1-methyl-2,4-dibromo-5-chloro imidazole;
1-methyl-2,4,5-tribromo imidazole;
1-n-butyl-2,4,5-tribromo imidazole;
1-methyl-2,4,5-trichloro imidazole;
2,4-dibromo-5-nitro imidazole;
4,5-dicyano imidazole;
1-ethyl-2-methyl-4-bromo-5-chloro imidazole;
2-bromo-4,5-dicyano imidazole;
1-methyl-5-chloro-4-nitro imidazole;
1-ethyl-2-methyl-5-chloro-4-nitro imidazole;
1-methyl-4,5-dibromo imidazole;
1-isopropyl-2,4,5-tribromo imidazole;
1-cyanoethyl-2,4,5-tribromo imidazole;
2-methyl-4,5-dibromo imidazole;
1-n-amyl-2,4,5-tribromo imidazole;
1-benzyl-2,4,5-tribromo imidazole;
1-allyl-2,4,5-tribromo imidazole;

Imidazoles according to this invention may be synthesized by the method of K. Hofmann (Imidazole and its Derivatives p. 120, London 1953).

The following examples are presented to illustrate the manner in which the invention may be carried out.

EXAMPLE I

Tests with nutrient solution

The effect of the imidazoles on the increase and the growth of leaf cells was determined by placing sterile duck weed (*Lemna minor*) in a sterile Hoagland nutrient solution containing 1% of sucrose and 1 or 10 p.p.m. (parts by weight per million) of imidazole. The plants were subsequently exposed to constant light at a temperature of 24° C. After 14 days when the test plants covered the surface of the solution, the growth-hindering effect of the active component was evaluated and recorded on a scale of from 0 to 9, 0 signifying no effect and 9 complete destruction of all plants.

In further tests brome grass (*Bromus tectorum*) seedlings were grown in a porous medium under the same light-exposure and temperature conditions, of course only the roots protruding into the nutrient solution which contained 1 or 10 p.p.m. of the active component. The results of the tests and of the comparative tests are summarized in the following table.

TABLE I

| Active component | Lemna, p.p.m. | | Bromus, p.p.m. | |
|---|---|---|---|---|
| | 1 | 10 | 1 | 10 |
| 2,4,5-tribromo imidazole | 9 | 9 | 4 | 9 |
| 4,5-dibromo imidazole | 8 | 9 | 0 | 6 |
| 2,4,5-triiodo imidazole | 8 | 9 | | |
| Benzylamine salt of 2,4,5-tribromo imidazole | 8 | 9 | 3 | 8 |

EXAMPLE II

Soil test

Vessels were filled with moist, sterile soil. Soil mixed with active component in amounts corresponding to 1 and 10 pounds per acre was then placed on the surface of the moist soil. Small, approximately equal amounts of seed of the test plants were placed on the surface of the toxically impregnated soil in each vessel. The seed was subsequently covered with moist sterile soil and then watered. The vessels were kept in a greenhouse for 14 days under identical conditions. The effect of the imidazoles was determined by visual observation of any plants found to be growing. Each test series also comprised a comparative test without herbicide.

In carrying out the test series seeds of the following plants were used:

Cress (*Lepidum sativum*), a broad-leaved plant, and cockspur grass (Echinochloa), a narrow-leaved plant.

The results of the test series are shown in Table II.

TABLE II

| Active Component | Lepidium, lbs./A | | Echinochloa, lns./A | |
|---|---|---|---|---|
| | 1 | 10 | 1 | 10 |
| 2,4,5-tribromo imidazole | 9 | 9 | 8 | 9 |
| Benzylamine salt of 2,4,5-tribromo imidazole | 9 | 9 | 7 | 9 |
| 2,4,5-triiodo imidazole | 8 | 9 | 7 | 9 |
| 4,5-dibromo imidazole | 9 | 9 | 1 | 8 |
| 1-methyl-2,4-dibromo-5-chloro imidazole | 9 | 9 | 2 | 8 |
| 1-methyl-2,4,5-tribromo imidazole | 9 | 9 | 5 | 8 |
| 1-n-butyl-2,4,5-tribromo imidazole | 7 | 9 | 1 | 6 |
| 4,5-dicyano imidazole | 7 | 9 | 2 | 8 |
| 4,5-dimethyl imidazole | 2 | 6 | 1 | 4 |

EXAMPLE III

Spray test

The effect of imidazoles according to the invention sprayed on the surface of growing plants was determined.

A mixture containing 2.5% by weight of the test substance in 20 cc. of water and 1% by weight of "Tween 20" as surface-active agent, was sprayed on the test plants in amounts corresponding to 1 and 10 pounds of the imidazole compound per acre.

Test plants were: foxtail (*Amaranthus retroflexus*) and panicle-grass (*Digitaria sanguinalis*). The plants were in a greenhouse; the results of the spray test were determined by inspection of the plants two weeks after spraying.

TABLE III

| Active component | Amaranthus, lbs./A | | Digitaria, lbs./A | |
|---|---|---|---|---|
| | 1 | 10 | 1 | 10 |
| 2,4,5-tribromo imidazole | 8 | 9 | 8 | 9 |
| 4,5-dibromo imidazole | 8 | 9 | 9 | 9 |
| 4,5-dicyano imidazole | 4 | 8 | 4 | 8 |
| 1-ethyl-2-methyl-5-chloro-4-nitro imidazole | 0 | 7 | 8 | 9 |

EXAMPLE IV

Field tests

Tribromo imidazole yielded a 99% control of broad-leaved weeds with the use of 2 pounds per acre, but when used in quantities approximately 2–8 pounds per acre there was only a temporary burning of grasses, which indicates a selective phytotoxicity for broad-leaved weeds. In germination tests germination of weeds was prevented with this component when used in quantities of approximately 2–8 pounds per acre. In order to obtain maximum results in preventing germination it is desirable for the active component to be thoroughly mixed with the soil. Similar results were obtained with triiodo imidazole. Complete prevention of germination was achieved in the case of broad-leaved weeds with a quantity of 3 pounds/acre and in the case of grasses with 7 pounds/acre. Tribromo imidazole proved to be more active at higher temperatures.

The following examples illustrate typical compositions in the invention.

EXAMPLE V

In order to prepare a spraying powder 20 parts by weight of the 2, 4, 5-tribromo imidazole salt of thiourea were thoroughly mixed with 8 parts by weight of "Belloid T.D." (condensation product of formaldehyde and alkyl aryl sulphonate) and 72 parts by weight of kaolin. Water may be added to this composition to form a suitable dispersion for use in horticulture.

EXAMPLE VI

In order to prepare a dust, 4 parts by weight of 4,5-dibromo imidazole were intimately mixed with 1 part by weight of Mg-stearate, 58 parts by weight of kaolin and 37 parts by weight of gypsum.

EXAMPLE VII

In order to prepare an emulsifying agent 25 parts by weight of 4,5-dicyano imidazole were dissolved in 65 parts by weight of toluene and 10 parts by weight of "Ethylan SE." The emulsifier is a mixture of lauric diethanol amide and a condensate of octyl phenol and ethylene oxide.

Different species of the imidazole herbicides of this invention exhibit somewhat different herbicidal properties, compared one with another. Further, their activity with respect to different kinds of plants differs considerably, permitting their use as selective herbicides in many cases. When used in relatively high dosages, these herbicides are powerful general herbicides, apparently exhibiting more activity when applied pre-emergence than when applied post-emergence. At lower dosages, the herbicides act selectively.

The imidazole herbicides of this invention are not very volatile, and tend to remain in that part of the soil into which they are introduced; some may be moved through the soil by water. Consequently, by appropriate selection of the part of the soil into which they are introduced, relative to the seeds of wanted plants, and those of unwanted plants, and taking into account the effect of water, these herbicides can be used to prevent all plant growth, even at relatively low dosages in some cases, or their selectivity can be improved to prevent growth of unwanted plants without harm to wanted plants. For example, as is well known, only those weed seeds which are present within about one-quarter inch of the surface of the soil will germinate, whereas the seeds of cereal, and other, crops, for example, ordinarily are sown about one-half to three-quarters of an inch below the surface of the soil, and germinate well under these conditions. By introducing the imidazole herbicide only into the top one-quarter inch of the soil, and avoiding excessive watering, germination of the weed seeds can be prevented, while germination of the crop seeds will not be affected. Thus, even those of the imidazole herbicides of this invention that are not very selective in their action can be used to selectively remove weeds from cereal grains of other crops. Of course, it complete kill of all plants in a given portion of soil is described, it is necessary only to introduce one or more of the imidazole herbicides throughout that portion of soil.

The imidazoles are soluble in the common organic horticultural solvents. Thus, according to the intended method of application, the character of the plants involved, and the concentration of herbicide to be used, the herbicidal imidazole can be formulated as a solution or suspension in water, or a suitable nonphytotoxic organic solvent, as a dispersion or emulsion of the active agent in a non-solvent therefor, as an emulsion of a solution of the active agent in a suitable solvent emulsified with a second, inhomogeneous liquid, or as a solid comprising the active agent or agents sorbed on a sorptive solid carrier. Where a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, oils of animal or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such to the plants or to the soil that is to be treated, or they may be suspended in water and the suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agents as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts, for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example, Triton X-100 and Lissapol N—believed to be condensation products of alkylphenols with ethylene oxide—and Tweens—believed to be condensation products of ethylene oxide and higher fatty acid esters, for example, oleic acid ester of anhydrosorbitols.

Liquid compositions of these herbicidal imidazoles suitable for application to plants or to their environment contain the active agent or agents in concentrations generally within the range of from about 0.01% by weight to about 25% by weight.

The invention includes novel solid compositions of matter wherein the active agent or agents are absorbed or adsorbed in or on a sorptive carrier, such as finely divided clay, talc, gypsum, lime, wood flour, fuller's earth, kieselguhr, or the like. The solid composition, or dust, may contain from as little as 1% by weight of active material to 50% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.5 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain one or more of the herbicidal imidazoles set out hereinbefore as the sole active agent, or they may contain in addition thereto other biologically active substances. Thus, insecticides, e.g., DDT, endrin, dieldrin, aldrin, chlordane, demeton, methoxychlor, DDVP, naled, Ciodrin® Insecticide and Bidrin® Insecticide, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners other plant regulators, such as naphthaleneacetic acid, 2,4 - dichlorophenoxyacetic acid and the like, and/or herbicides of different properties.

We claim as our invention:

1. A method for the control of undesirable plant growth which comprises applying to an area to be protected from such growth a herbicidally effective amount of an imidazole compound of the formula:

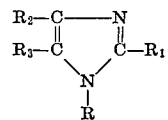

wherein R is selected from the group consisting of hydrogen and lower alkyl; $R_1$, $R_2$ and $R_3$ are selected from the group consisting of hydrogen and halogen, and where at least one of $R_1$, $R_2$ and $R_3$ is halogen.

2. A method for the control of undesirable plant growth which comprises applying to an area to be protected from such growth a herbicidally effective amount of an imidazole compound of the formula:

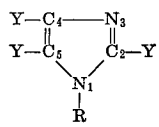

wherein R is a member of the group consisting of hydrogen, alkyl of from 1 to 10 carbon atoms, cyanoethyl and allyl; and each Y is a member of the group consisting of hydrogen; alkyl of from 1 to 4 carbon atoms, and negative moieties of the group consisting of cyano, halogen and nitro, with the proviso that at least two of Y are such negative moieties.

3. A method for the control of undesirable plant growth which comprises applying to an area to be protected from such growth a herbicidally effective amount of an imidazole compound of the formula:

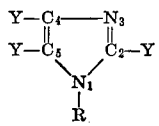

wherein R is a member of the group consisting of hydrogen, alkyl of from 1 to 10 carbon atoms, cyanoethyl and allyl; and each Y is bromine.

4. A method for the control of undesirable plant growth which comprises applying to an area to be protected from such growth a herbicidally effective amount of an imidazole compound of the formula:

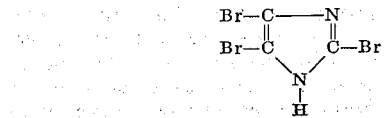

References Cited

UNITED STATES PATENTS

| | | | |
|---|---|---|---|
| 3,261,873 | 7/1966 | Johnson | 71—92 X |
| 3,409,606 | 11/1968 | Lutz | 71—92 X |
| 3,423,420 | 1/1969 | Buchel et al. | 71—92 X |

OTHER REFERENCES

Brunings: Chemical Abstract, vol. 41—3796a (1947).
Cowgill: Chemical Abstract, vol. 50—3955h (1956).
McCorquodaie: Chemical Abstract, vol. 50—7971b (1956).
Klingensmith: Chemical Abstract, vol. 55—7568f (1961).

JAMES O. THOMAS, JR., Primary Examiner

U.S. Cl. X.R.

71—115, 117